(12) United States Patent
Wang

(10) Patent No.: US 10,493,630 B2
(45) Date of Patent: Dec. 3, 2019

(54) INDUSTRIAL ROBOT APPARATUS

(71) Applicant: Xiong Wang, Ningbo (CN)

(72) Inventor: Xiong Wang, Ningbo (CN)

(73) Assignee: Gang Wu, Pujiang County, Zhejiang Province (CN)

( * ) Notice: Subject to any disclaimer, the term of this patent is extended or adjusted under 35 U.S.C. 154(b) by 0 days.

(21) Appl. No.: 16/228,810

(22) Filed: Dec. 21, 2018

(65) Prior Publication Data

US 2019/0134823 A1    May 9, 2019

(30) Foreign Application Priority Data

Jun. 14, 2018    (CN) .......................... 2018 1 06149499

(51) Int. Cl.
| | |
|---|---|
| *B25J 17/00* | (2006.01) |
| *B25J 17/02* | (2006.01) |
| *B25J 18/00* | (2006.01) |
| *B25J 11/00* | (2006.01) |
| *B25J 5/00* | (2006.01) |
| *B25J 9/10* | (2006.01) |

(Continued)

(52) U.S. Cl.
CPC ............. *B25J 11/005* (2013.01); *B25J 5/007* (2013.01); *B25J 9/046* (2013.01); *B25J 9/104* (2013.01); *B25J 13/086* (2013.01); *B25J 15/0293* (2013.01)

(58) Field of Classification Search
CPC . B25J 11/005; B25J 9/104; B25J 9/046; B25J 9/042; B25J 19/0079
See application file for complete search history.

(56) References Cited

U.S. PATENT DOCUMENTS

| | | | | |
|---|---|---|---|---|
| 2007/0199399 A1* | 8/2007 | Okazaki | ................... | B25J 9/104 74/490.05 |
| 2015/0135880 A1* | 5/2015 | Zaruba | ..................... | B25J 9/042 74/490.01 |

(Continued)

FOREIGN PATENT DOCUMENTS

| | | |
|---|---|---|
| CN | 206643928 U | 11/2017 |
| CN | 107552820 A | 1/2018 |

(Continued)

OTHER PUBLICATIONS

First Office Action for Chinese Counterpart Application 2018106149499 dated Sep. 18, 2018.

(Continued)

*Primary Examiner* — Jake Cook

(57) ABSTRACT

An industrial robot apparatus comprises an apparatus main body, a handling device, a moving device. The moving device comprises a first groove, a first motor in one inner wall of the first groove, a first lead screw on one end of the first motor. The first motor is turned on to drive the first lead screw to rotate to move the slide block on the first lead screw and a clamp block to the same side. The upper end of the slide block is fixedly connected with a first working block. A second motor in the upper end of the first working block is turned on to drive a revolving shaft to rotate, so a second working block rotates to drive the clamp block to rotate to the designated position so as to intelligently and automatically carry out handling works to multi-directional designated positions in industrial production process.

4 Claims, 3 Drawing Sheets

(51) Int. Cl.
   *B25J 9/04*     (2006.01)
   *B25J 13/08*    (2006.01)
   *B25J 15/02*    (2006.01)

(56) References Cited

U.S. PATENT DOCUMENTS

2017/0312924 A1* 11/2017 Kinoshita ............ B25J 15/0009
2018/0263719 A1*  9/2018 Choi ...................... A61B 34/71

FOREIGN PATENT DOCUMENTS

| CN | 207044161 U    | 2/2018 |
| DE | 102015200514 B3 | 6/2016 |
| JP | H09174469 A    | 7/1997 |

OTHER PUBLICATIONS

Notification of Grant for Chinese Counterpart Application 2018106149499 dated Oct. 17, 2018.

* cited by examiner

INDUSTRIAL ROBOT APPARATUS

CROSS-REFERENCES TO RELATED APPLICATIONS

The present application claims priority from Chinese application No. 2018106149499 filed on 2018 Jun. 14 which is hereby incorporated by reference in its entirety.

TECHNICAL FIELD

The invention relates to the field of industrial production, in particular to an industrial robot apparatus.

BACKGROUND OF THE INVENTION

Nowadays China's industrial production development is getting better and better. In production, the workpiece or object often need to be carried during the process or after completion of the production. Apparatuses in the past are all limited in handling functions. Thus an apparatus is needed to intelligently and automatically carry out the handling work to multi-directional designated positions in the industrial production process. Furthermore, above said apparatus may also be applied to large-scale industrial production, so as to reduce the operation time needed for manpower and increase the production efficiency. Therefore, it is necessary to design an intelligent and automatic industrial robot apparatus.

BRIEF SUMMARY OF THE INVENTION

The technical problem to be solved by the invention is to provide an industrial robot apparatus so as to overcome the problems existing in the prior art.

The following technical plan is adopted by the invention: an industrial robot apparatus comprises an apparatus main body, a handling device which is arranged at said apparatus main body and a moving device arranged in said apparatus main body, wherein said moving device comprises a first groove with the opening facing upwards arranged on the upper end of said apparatus main body. A first motor, which is fixedly arranged at one inner wall of said first groove, is in power connection on one end with a first lead screw. A slide block, which can move side to side in said first groove, is in threaded fit connection with said first lead screw. The upper end of said slide block extends out from said first groove and is fixedly connected with a first working block. A second motor is fixedly arranged in the upper end of said first working block. A first revolving shaft is in power matching connection with the upper end of said second motor, wherein a second working block is fixedly mounted on the upper end of said first revolving shaft. A circular groove with the opening facing upwards is arranged on the upper end of said first working block, wherein symmetric guide blocks whose lower ends extend into said circular groove and are in sliding fit connection with inner wall of said circular groove, are fixedly connected on the lower end of said second working block, wherein a second groove with the opening facing upwards is arranged at the upper end of said second working block, wherein a second revolving shaft whose back end is in a power matching connection with the motor fixedly arranged in back inner wall of said second groove, is arranged in said second groove, and the front end of said second revolving shaft is in rotational fit connection with front inner wall of said second groove through a bearing, wherein said second revolving shaft is fixedly connected with a spinning reel. Symmetric support rods are fixedly connected with one side of upper end of said second working block, wherein a rotatable third working block is arranged near the upper end between said support rods, wherein a third revolving shaft whose front end is in rotational engagement with back end of said front support rod through a bearing, is fixedly connected with said third working block, wherein a third groove with the opening facing forwards is arranged at the front end of said back support rod, wherein the back end of said third revolving shaft is in rotational fit connection through a bearing with back inner wall of said third groove, wherein an air pump device is fixedly arranged in back inner wall of said third groove, and atmospheric pressure processing devices which are communicated with said air pump device through gas conduits, are fixedly arranged in inner walls of upper and lower side of said third groove, wherein the facing end faces of said atmospheric pressure processing devices are in a power matching connection with fastening plates through slide levers. Symmetric first support blocks are fixedly connected with one end of said third working block, wherein a first rotary wheel is in rotational engagement with and arranged between said first support blocks through a revolving shaft. Symmetric second support blocks are fixedly connected with the upper end of said third working block, wherein a second rotary wheel is in rotational engagement with and arranged between said second support blocks through a revolving shaft, and the other end of said third working block is fixedly connected with a clamp device.

As an optimized technical proposal, said clamp device comprises a fixed block in fixed connection with one end of said third working block, wherein a fourth groove with the opening facing upwards is arranged at the upper end of said fixed block, wherein a third rotary wheel is in rotational engagement with and arranged in said fourth groove through a revolving shaft, and a first communicating pore is arranged to penetrate through downside inner wall of said fourth groove from top to bottom. The lower side of said fixed block is provided with a clamp block, wherein the upper end of said clamp block is fixedly connected with a lead wire, and the other end of said lead wire extends through said first communicating pore and then said lead wire winds around said third rotary wheel, said second rotary wheel and said first rotary wheel, then said lead wire extends into said second groove and then winds around said spinning reel, wherein the lower end of said clamp block is provided with a fifth groove with the opening facing downwards, wherein a first pneumatic cylinder is fixedly arranged on the upper inner wall of said fifth groove, and telescopic devices are fixedly arranged on the side inner walls of said fifth groove, wherein said first pneumatic cylinder is communicated with symmetric tubes whose other ends are communicated with said telescopic devices, and the facing ends of said telescopic devices are in a power matching connection with clamp plates through slider bars. Symmetric induction blocks are fixedly connected with the side inner walls of said fifth groove, and when the induction blocks induce, the first pneumatic cylinder works to clamp the object or workpiece.

As an optimized technical proposal, said moving device comprises a third motor which is fixedly arranged in lower end of said apparatus main body, wherein symmetric fourth revolving shafts are in a power matching connection with both ends of said third motor. The front side of lower end of said apparatus main body is provided with a steering device, and symmetric drive grooves with the opening facing downwards are arranged at lower ends of said apparatus main body, wherein the other ends of said fourth revolving shafts extend into said drive grooves and are in rotational engagement through bearings with the side inner walls away from said third motor of said drive grooves, and said fourth revolving shafts in said drive grooves are fixedly connected with moving wheels. Symmetric second pneumatic cylinders are fixedly arranged in both ends of said apparatus main body, wherein the lower ends of said second pneumatic cylinders are in a power matching connection with telescopic rods, and the lower ends of said telescopic rods are fixedly connected with fixed base blocks.

As an optimized technical proposal, the upper end of said clamp block is fixedly connected with a lower bumper block and the lower end of said fixed block is fixedly connected with an upper bumper block. The collision and extrusion between said clamp block and the fixed block can be mitigated by said lower bumper block and said upper bumper block.

The benefits of the invention are as follows:
The invention has a simple structure and it is convenient to operate. When carrying out industrial handling work with this apparatus, the third motor is turned on to rotate the fourth revolving shafts so as to drive the moving wheels to rotate. When the apparatus moves to the designated position, the second pneumatic cylinders are turned on to drive the telescopic rods down, and then the fixed base blocks touch the ground and then extrude and fix the apparatus main body. At this point, the second revolving shaft is turned on rotating to drive the spinning reel to rotate and the lead wire is extended, and then the clamp block moves down, and then the workpiece or object is extended into the fifth groove to be induced by the induction blocks. At this time, the first pneumatic cylinder is opened to drive the telescopic devices to work so that the clamp plates are close to each other to clamp the object. And then the second revolving shaft continues to drive the clamp block and the object to move up. Then the lower bumper block and the upper buffer block touch with each other and are unable to move up. At this time, if it is necessary to make the object move upward, the air pump device is turned on to drive the atmospheric pressure processing devices to work so that the fastening plates are far away to release the third revolving shaft. Then the second revolving shaft is continuedly turned on to rotate and pull the lead wire. At this time, as the clamp block touches the fixed block, the third working block is driven to turn over through the third revolving shaft to move the clamp block up. When the height is reached, the air pump device is turned on and the fastening plates return to the initial state. Then the first motor is turned on to drive the first lead screw to rotate to move the slide block to one side, and to drive the clamp block to the same side. When the second revolving shaft is turned on to rotate to extend the lead wire to move the clamp block down in a designated place, the first pneumatic cylinder is turned on to lower the object down. After the completion, the apparatus returns to the initial state. If the object needs to be moved horizontally to other positions, the second motor is turned on to drive the first revolving shaft to rotate so as to rotate the second working block to drive the clamp block to rotate to the designated position. After the first motor is turned on to move the slide block, the second revolving shaft is turned on to put the object down and the apparatus returns to the initial state again. This apparatus can intelligently and automatically carry out the handling work to multi-directional designated positions in the industrial production process. Furthermore, above said apparatus may also be applied to large-scale industrial production, so as to reduce the operation time needed for manpower and increase the production efficiency.

BRIEF DESCRIPTION OF THE DRAWINGS

For better explanation, the present invention will be detailedly described by embodiments and drawings below.

DETAILED DESCRIPTION OF THE INVENTION

Figure 1:
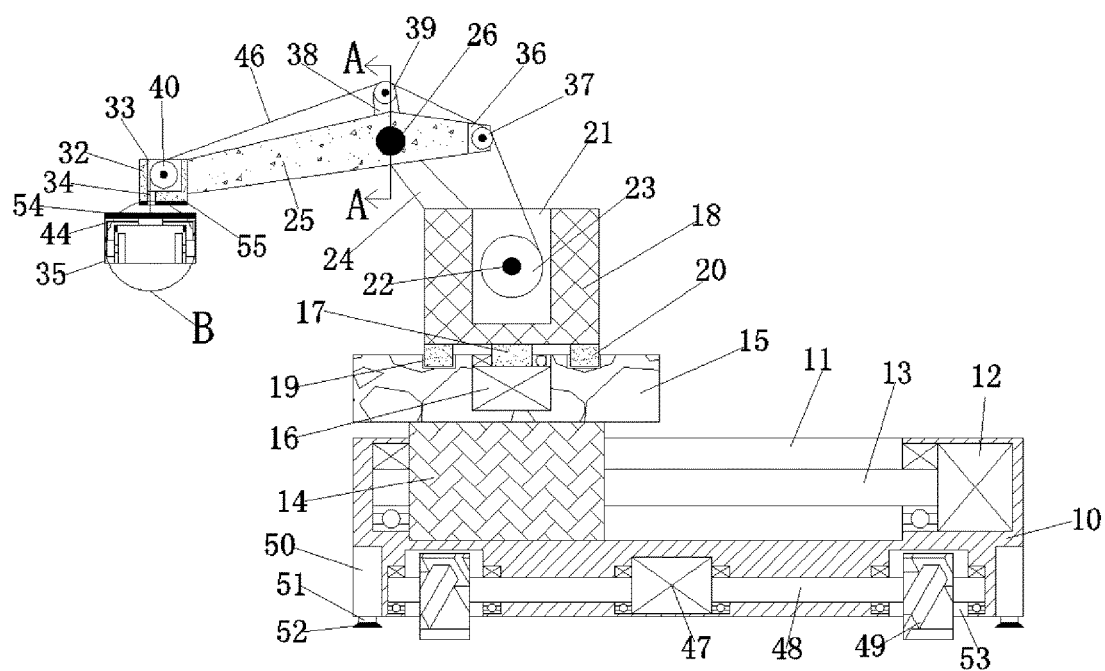
FIG. 1 is a schematic diagram depicting an overall configuration inside the industrial robot apparatus in this invention.
Figure 2:
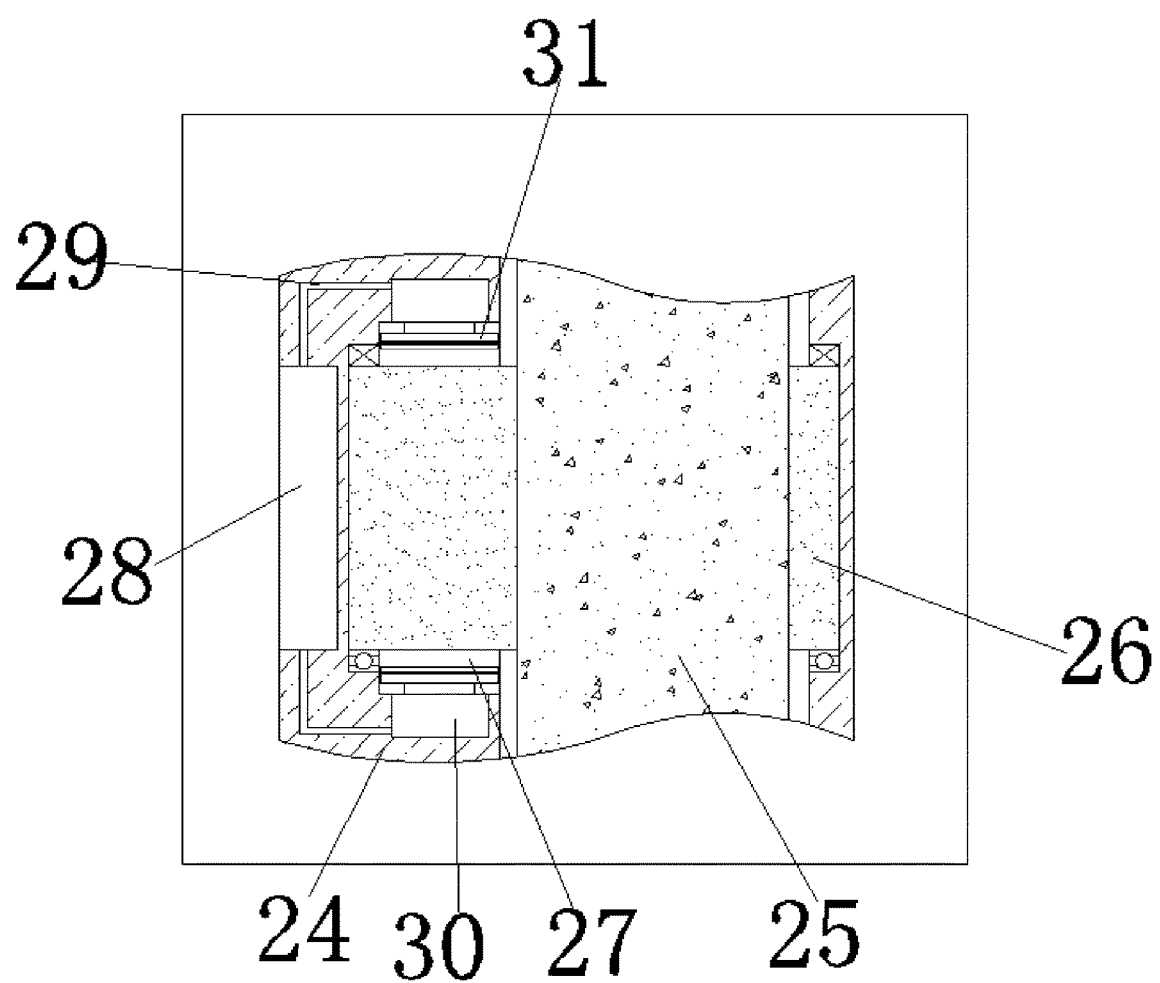
FIG. 2 is a left view along "A-A" direction in FIG. 1.
Figure 3:
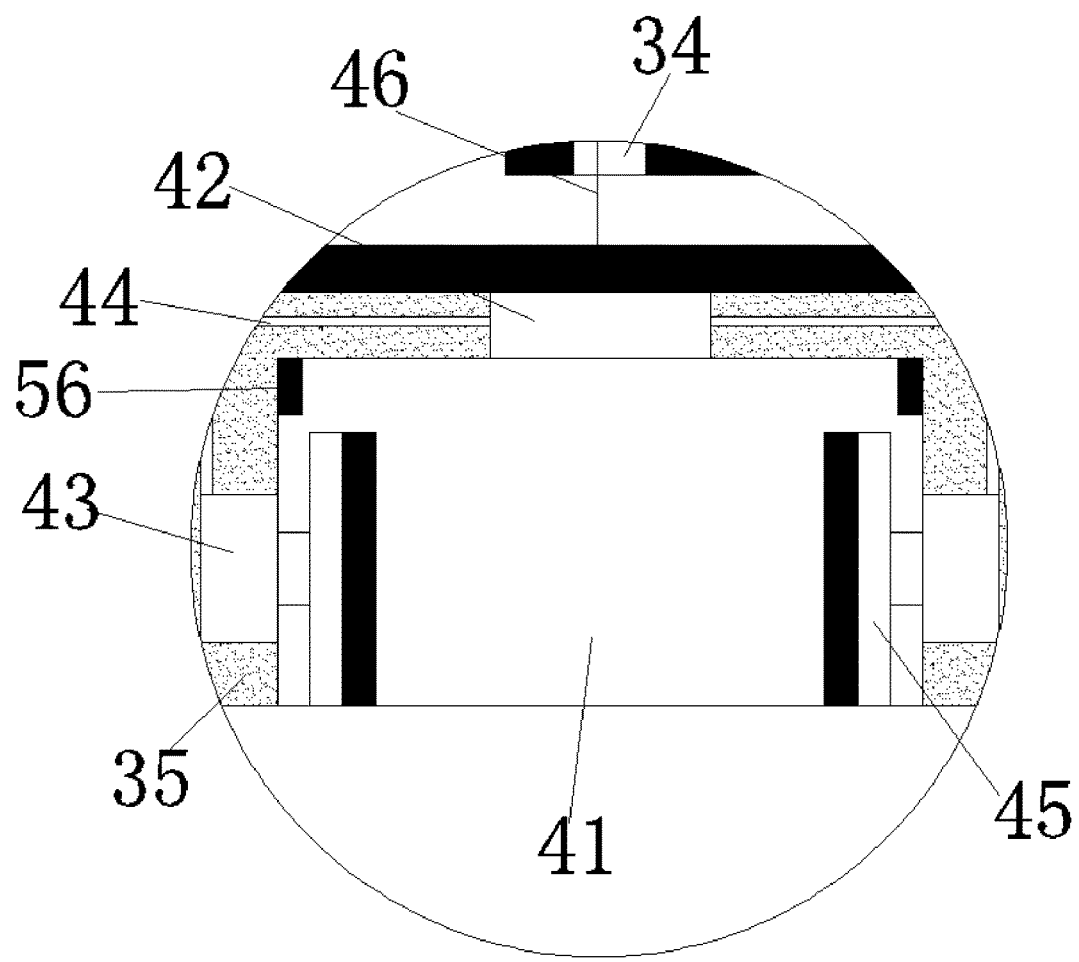
FIG. 3 is an enlarged schematic diagram of "B" in FIG. 1.

Referring to FIG. 1-3, an industrial robot apparatus of the present invention comprises an apparatus main body 10, a handling device which is arranged at said apparatus main body 10 and a moving device arranged in said apparatus main body 10, wherein said moving device comprises a first groove 11 with the opening facing upwards arranged on the upper end of said apparatus main body 10. A first motor 12, which is fixedly arranged at one inner wall of said first groove 11, is in power connection on one end with a first lead screw 13. A slide block 14, which can move side to side in said first groove 11, is in threaded fit connection with said first lead screw 13. The upper end of said slide block 14 extends out from said first groove 11 and is fixedly connected with a first working block 15. A second motor 16 is fixedly arranged in the upper end of said first working block 15. A first revolving shaft 17 is in power matching connection with the upper end of said second motor 16, wherein a second working block 18 is fixedly mounted on the upper end of said first revolving shaft 17. A circular groove 19 with the opening facing upwards is arranged on the upper end of said first working block 15, wherein symmetric guide blocks 20 whose lower ends extend into said circular groove 19 and are in sliding fit connection with inner wall of said circular groove 19, are fixedly connected on the lower end of said second working block 18, wherein a second groove 21 with the opening facing upwards is arranged at the upper end of said second working block 18, wherein a second revolving shaft 22 whose back end is in a power matching connection with the motor fixedly arranged in back inner wall of said second groove 21, is arranged in said second groove 21, and the front end of said second revolving shaft 22 is in rotational fit connection with front inner wall of said second groove 21 through a bearing, wherein said second revolving shaft 22 is fixedly connected with a spinning reel 23. Symmetric support rods 24 are fixedly connected with one side of upper end of said second working block 18, wherein a rotatable third working block 25 is arranged near the upper end between said support rods 24, wherein a third revolving shaft 26 whose front end is in rotational engagement with back end of said front support rod 24 through a bearing, is fixedly connected with said third working block 25, wherein a third groove 27 with the opening facing forwards is arranged at the front end of said back support rod 24, wherein the back end of said third revolving shaft 26 is in rotational fit connection through a bearing with back inner wall of said third groove 27, wherein an air pump device 28 is fixedly arranged in back inner wall of said third groove 27, and atmospheric pressure processing devices 30 which are communicated with said air pump device 28 through gas conduits 29, are fixedly arranged in inner walls of upper and lower side of said third groove 27, wherein the facing end faces of said atmospheric pressure processing devices 30 are in a power matching connection with fastening plates 31 through slide levers. Symmetric first support blocks 36 are fixedly connected with one end of said third working block 25, wherein a first rotary wheel 37 is in rotational engagement with and arranged between said first support blocks 36 through a revolving shaft. Symmetric second support blocks 38 are fixedly connected with the upper end of said third working block 25, wherein a second rotary wheel 39 is in rotational engagement with and arranged between said second support blocks 38 through a revolving shaft, and the other end of said third working block 25 is fixedly connected with a clamp device.

Helpfully, said clamp device comprises a fixed block 32 in fixed connection with one end of said third working block 25, wherein a fourth groove 33 with the opening facing upwards is arranged at the upper end of said fixed block 32, wherein a third rotary wheel 40 is in rotational engagement with and arranged in said fourth groove 33 through a revolving shaft, and a first communicating pore 34 is arranged to penetrate through downside inner wall of said fourth groove 33 from top to bottom. The lower side of said fixed block 32 is provided with a clamp block 35, wherein the upper end of said clamp block 35 is fixedly connected with a lead wire 46, and the other end of said lead wire 46 extends through said first communicating pore 34 and then said lead wire 46 winds around said third rotary wheel 40, said second rotary wheel 39 and said first rotary wheel 37, then said lead wire 46 extends into said second groove 21 and then winds around said spinning reel 23, wherein the lower end of said clamp block 35 is provided with a fifth groove 41 with the opening facing downwards, wherein a first pneumatic cylinder 42 is fixedly arranged on the upper inner wall of said fifth groove 41, and telescopic devices 43 are fixedly arranged on the side inner walls of said fifth groove 41, wherein said first pneumatic cylinder 42 is communicated with symmetric tubes 44 whose other ends are communicated with said telescopic devices 43, and the facing ends of said telescopic devices 43 are in a power matching connection with clamp plates 45 through slider bars. Symmetric induction blocks 56 are fixedly connected with the side inner walls of said fifth groove 41, and when the induction blocks 56 induce, the first pneumatic cylinder 42 works to clamp the object or workpiece.

Helpfully, said moving device comprises a third motor 47 which is fixedly arranged in lower end of said apparatus main body 10, wherein symmetric fourth revolving shafts 48 are in a power matching connection with both ends of said third motor 47. The front side of lower end of said apparatus main body 10 is provided with a steering device, and symmetric drive grooves 53 with the opening facing downwards are arranged at lower ends of said apparatus main body 10, wherein the other ends of said fourth revolving shafts 48 extend into said drive grooves 53 and are in rotational engagement through bearings with the side inner walls away from said third motor 47 of said drive grooves 53, and said fourth revolving shafts 48 in said drive grooves 53 are fixedly connected with moving wheels 49. Symmetric second pneumatic cylinders 50 are fixedly arranged in both ends of said apparatus main body 10, wherein the lower ends of said second pneumatic cylinders 50 are in a power matching connection with telescopic rods 51, and the lower ends of said telescopic rods 51 are fixedly connected with fixed base blocks 52.

Helpfully, the upper end of said clamp block 35 is fixedly connected with a lower bumper block 54 and the lower end of said fixed block 32 is fixedly connected with an upper bumper block 55. The collision and extrusion between said clamp block 35 and the fixed block 32 can be mitigated by said lower bumper block 54 and said upper bumper block 55.

When the present invention is in the initial state, said slide block 14 is in the middle position, and said clamp block 35 is on one side of said apparatus main body 10. The third working block 25 is in the horizontal position and said fastening plates 31 touch the third revolving shaft 26. The lower bumper block 54 and upper bumper block 55 touch each other by the maximum upward movement of the clamp block 35, and then the distance between clamp plates 45 is at the maximum.

When carrying out industrial handling work with this apparatus, the third motor 47 is turned on to rotate the fourth revolving shafts 48 so as to drive the moving wheels 49 to rotate. When the apparatus moves to the designated position, the second pneumatic cylinders 50 are turned on to drive the telescopic rods 51 down, and then the fixed base blocks 52 touch the ground and then extrude and fix the apparatus main body 10. At this point, the second revolving shaft 22 is turned on rotating to drive the spinning reel 23 to rotate and the lead wire 46 is extended, and then the clamp block 35 moves down, and then the workpiece or object is extended into the fifth groove 41 to be induced by the induction blocks 56. At this time, the first pneumatic cylinder 42 is opened to drive the telescopic devices 43 to work so that the clamp plates 45 are close to each other to clamp the object. And then the second revolving shaft 22 continues to drive the clamp block 35 and the object to move up. Then the lower bumper block 54 and the upper buffer block 55 touch with each other and are unable to move up. At this time, if it is necessary to make the object move upward, the air pump device 28 is turned on to drive the atmospheric pressure processing devices 30 to work so that the fastening plates 31 are far away to release the third revolving shaft 26. Then the second revolving shaft 22 is continuedly turned on to rotate and pull the lead wire 46. At this time, as the clamp block 35 touches the fixed block 32, the third working block 25 is driven to turn over through the third revolving shaft 26 to move the clamp block 35 up. When the height is reached, the air pump device 28 is turned on and the fastening plates 31 return to the initial state. Then the first motor 12 is turned on to drive the first lead screw 13 to rotate to move the slide block 14 to one side, and to drive the clamp block 35 to the same side. When the second revolving shaft 22 is turned on to rotate to extend the lead wire 46 to move the clamp block 35 down in a designated place, the first pneumatic cylinder 42 is turned on to lower the object down. After the completion, the apparatus returns to the initial state. If the object needs to be moved horizontally to other positions, the second motor 16 is turned on to drive the first revolving shaft 17 to rotate so as to rotate the second working block 18 to drive the clamp block 35 to rotate to the designated position. After the first motor 12 is turned on to move the slide block 14, the second revolving shaft 22 is turned on to put the object down and the apparatus returns to the initial state again.

The benefits of the invention are as follows: The invention has simple structure and it is convenient to operate. When carrying out industrial handling work with this apparatus, the third motor is turned on to rotate the fourth revolving shafts so as to drive the moving wheels to rotate. When the apparatus moves to the designated position, the second pneumatic cylinders are turned on to drive the telescopic rods down, and then the fixed base blocks touch the ground and then extrude and fix the apparatus main body. At this point, the second revolving shaft is turned on rotating to drive the spinning reel to rotate and the lead wire is extended, and then the clamp block moves down, and then the workpiece or object is extended into the fifth groove to be induced by the induction blocks. At this time, the first pneumatic cylinder is opened to drive the telescopic devices to work so that the clamp plates are close to each other to clamp the object. And then the second revolving shaft continues to drive the clamp block and the object to move up. Then the lower bumper block and the upper buffer block touch with each other and are unable to move up. At this time, if it is necessary to make the object move upward, the air pump device is turned on to drive the atmospheric pressure processing devices to work so that the fastening plates are far away to release the third revolving shaft. Then the second revolving shaft is continuedly turned on to rotate and pull the lead wire. At this time, as the clamp block touches the fixed block, the third working block is driven to turn over through the third revolving shaft to move the clamp block up. When the height is reached, the air pump device is turned on and the fastening plates return to the initial state. Then the first motor is turned on to drive the first lead screw to rotate to move the slide block to one side, and to drive the clamp block to the same side. When the second revolving shaft is turned on to rotate to extend the lead wire to move the clamp block down in a designated place, the first pneumatic cylinder is turned on to lower the object down. After the completion, the apparatus returns to the initial state. If the object needs to be moved horizontally to other positions, the second motor is turned on to drive the first revolving shaft to rotate so as to rotate the second working block to drive the clamp block to rotate to the designated position. After the first motor is turned on to move the slide block, the second revolving shaft is turned on to put the object down and the apparatus returns to the initial state again. This apparatus can intelligently and automatically carry out the handling work to multi-directional designated positions in the industrial production process. Furthermore, above said apparatus may also be applied to large-scale industrial production, so as to reduce the operation time needed for manpower and increase the production efficiency.

The above is only the specific embodiment of the invention, but the scope of the invention is not limited thereto, and any changes or substitutions without the creative work should be included in the the claimed protection extent of this invention. Therefore, the claimed protection extent of the invention shall be determined with reference to the appended claims.

The invention claimed is:

1. An industrial robot apparatus of the present invention, comprising:
   an apparatus main body;
   a handling device which is arranged at said apparatus main body and a moving device arranged in said apparatus main body,
   wherein said moving device comprises a first groove with the opening facing upwards arranged on the upper end of said apparatus main body, and a first motor, which is fixedly arranged at one inner wall of said first groove, is in power connection on one end with a first lead screw, and a slide block, which can move side to side in said first groove, is in threaded fit connection with said first lead screw, and the upper end of said slide block extends out from said first groove and is fixedly connected with a first working block;
   a second motor fixedly arranged in the upper end of said first working block;
   a first revolving shaft in power matching connection with the upper end of said second motor, wherein a second working block is fixedly mounted on the upper end of said first revolving shaft;
   a circular groove with the opening facing upwards arranged on the upper end of said first working block,
   wherein symmetric guide blocks whose lower ends extend into said circular groove and are in a sliding fit connection with said inner wall of said circular groove, are fixedly connected on the lower end of said second working block;
   a second groove with the opening facing upwards arranged at the upper end of said second working block;
   wherein a second revolving shaft whose back end is in a power matching connection with the motor fixedly arranged in a back inner wall of said second groove, is arranged in said second groove, and the front end of said second revolving shaft is in a rotational fit connection with a front inner wall of said second groove through a bearing,
   wherein said second revolving shaft is fixedly connected with a spinning reel, and symmetric support rods are fixedly connected with one side of upper end of said second working block;
   a rotatable third working block arranged near the upper end between said support rods,
   wherein a third revolving shaft whose front end is in rotational engagement with back end of said front support rod through a first bearing, is fixedly connected with said third working block,
   a third groove with the opening facing forwards arranged at the front end of said back support rod, wherein the back end of said third revolving shaft is in rotational fit connection through a second bearing with back inner wall of said third groove;
   an air pump device fixedly arranged in back inner wall of said third groove;
   wherein atmospheric pressure processing devices which are communicated with said air pump device through gas conduits, are fixedly arranged in inner walls of upper and lower side of said third groove,
   wherein the facing end faces of said atmospheric pressure processing devices are in a power matching connection with fastening plates through slide levers, and symmetric first support blocks are fixedly connected with one end of said third working block,
   wherein a first rotary wheel is in rotational engagement with and arranged between said first support blocks through a revolving shaft, and symmetric second support blocks are fixedly connected with the upper end of said third working block,
   wherein a second rotary wheel is in rotational engagement with and arranged between said second support blocks through a revolving shaft, and the other end of said third working block is fixedly connected with a clamp device;
   wherein the first motor is turned on to drive the first lead screw to rotate to move the slide block to one side, and to drive the clamp block to the same side, and when the second revolving shaft is turned on to rotate to extend the lead wire to move the clamp block down in a designated place, a first pneumatic cylinder is turned on to lower the object down.

2. The industrial robot apparatus as defined in claim 1, wherein said clamp device comprises a fixed block in fixed connection with one end of said third working block, and a fourth groove with the opening facing upwards is arranged at the upper end of said fixed block;

wherein a third rotary wheel is in rotational engagement with and arranged in said fourth groove through a revolving shaft, and a first communicating pore is arranged to penetrate through downside inner wall of said fourth groove from top to bottom, and the lower side of said fixed block is provided with a clamp block;

wherein the upper end of said clamp block is fixedly connected with a lead wire, and the other end of said lead wire extends through said first communicating pore and then said lead wire winds around said third rotary wheel, said second rotary wheel and said first rotary wheel, then said lead wire extends into said second groove and then winds around said spinning reel;

wherein the lower end of said clamp block is provided with a fifth groove with the opening facing downwards, wherein the first pneumatic cylinder is fixedly arranged on the upper inner wall of said fifth groove, and telescopic devices are fixedly arranged on the side inner walls of said fifth groove;

wherein said first pneumatic cylinder is communicated with symmetric tubes whose other ends are communicated with said telescopic devices, and the facing ends of said telescopic devices are in a power matching connection with clamp plates through slider bars, and symmetric induction blocks are fixedly connected with the side inner walls of said fifth groove, and when the induction blocks induce, the first pneumatic cylinder works to clamp the object or workpiece.

3. The industrial robot apparatus as defined in claim 1, wherein said moving device comprises a third motor which is fixedly arranged in lower end of said apparatus main body, wherein symmetric fourth revolving shafts are in a power matching connection with both ends of said third motor, and the front side of lower end of said apparatus main body is provided with a steering device, and symmetric drive grooves with the opening facing downwards are arranged at lower ends of said apparatus main body;

wherein the other ends of said fourth revolving shafts extend into said drive grooves and are in rotational engagement through bearings with the side inner walls away from said third motor of said drive grooves, and said fourth revolving shafts in said drive grooves are fixedly connected with moving wheels, and symmetric second pneumatic cylinders are fixedly arranged in both ends of said apparatus main body;

wherein the lower ends of said second pneumatic cylinders are in a power matching connection with telescopic rods, and the lower ends of said telescopic rods are fixedly connected with fixed base blocks;

wherein the third motor is turned on to rotate the fourth revolving shafts so as to drive the moving wheels to rotate, and when the apparatus moves to the designated position, the second pneumatic cylinders are turned on to drive the telescopic rods down, and then the fixed base blocks touch the ground and then extrude and fix the apparatus main body, and at this point, the second revolving shaft is turned on rotating to drive the spinning reel to rotate and the lead wire is extended, and then the clamp block moves down, and then the workpiece or object is extended into the fifth groove to be induced by the induction blocks.

4. The industrial robot apparatus as defined in claim 2, wherein the upper end of said clamp block is fixedly connected with a lower bumper block and the lower end of said fixed block is fixedly connected with an upper bumper block, and the collision and extrusion between said clamp block and the fixed block can be mitigated by said lower bumper block and said upper bumper block.

\* \* \* \* \*